US010834378B2

(12) United States Patent
Usami et al.

(10) Patent No.: US 10,834,378 B2
(45) Date of Patent: Nov. 10, 2020

(54) THREE-DIMENSIONAL INFORMATION DETECTION DEVICE (71) Applicants: FUJIFILM Corporation, Tokyo (JP); GROOVE X, INC., Tokyo (JP)

(72) Inventors: Yoshihisa Usami, Tokyo (JP); Nobuya Tanaka, Tokyo (JP); Hajime Terayoko, Tokyo (JP); Kaname Hayashi, Tokyo (JP)

(73) Assignees: FUJIFILM Corporation, Tokyo (JP); GROOVE X, INC., Tokyo (JP)

( * ) Notice: Subject to any disclaimer, the term of this patent is extended or adjusted under 35 U.S.C. 154(b) by 0 days.

(21) Appl. No.: 16/452,973

(22) Filed: Jun. 26, 2019

(65) Prior Publication Data
US 2019/0320162 A1 Oct. 17, 2019

Related U.S. Application Data (63) Continuation of application No. PCT/JP2018/002434, filed on Jan. 26, 2018.

(30) Foreign Application Priority Data

Jan. 31, 2017 (JP) ................................. 2017-015818

(51) Int. Cl.
H04N 13/254 (2018.01)
G06T 7/521 (2017.01)
(Continued)

(52) U.S. Cl.
CPC ....... *H04N 13/254* (2018.05); *G01B 11/2545* (2013.01); *G06T 7/521* (2017.01); *H04N 13/239* (2018.05)

(58) Field of Classification Search
CPC .... H04N 13/254; H04N 13/239; G06T 7/521; G06T 7/593; G01B 11/2545; G01B 11/245
See application file for complete search history.

(56) References Cited

U.S. PATENT DOCUMENTS 5,561,526 A * 10/1996 Huber ................ G01B 11/2504 356/604
9,654,748 B2 * 5/2017 Tagami ................ H04N 9/3194
(Continued)

FOREIGN PATENT DOCUMENTS

CN 101960253 A 1/2011
CN 104406539 A 3/2015
(Continued)

OTHER PUBLICATIONS

An Office Action; "Notification of Reasons for Refusal," mailed by the Japanese Patent Office dated Mar. 27, 2020, which corresponds to Japanese Patent Application No. 2018-565503 and is related to U.S. Appl. No. 16/452,973 with English language translation.
(Continued)

Primary Examiner — Marcus H Taningco
(74) Attorney, Agent, or Firm — Studebaker & Brackett PC (57) ABSTRACT Provided is a three-dimensional information detection device having a configuration in which detection accuracy of three-dimensional information of a measurement target object is not lowered even in a case where an optical system that includes a projection unit, a first imaging unit and a second imaging unit is covered with a light transmissive cover so that the optical system is not exposed to the outside. The three-dimensional information detection device includes the projection unit that projects an image pattern onto a measurement target object, the first imaging unit and the second imaging unit that respectively image the image pattern, a transmissive cover that covers the optical system that includes the projection unit, the first imaging unit, and the second imaging unit, and a calculation unit that calculates three-dimensional information of the measurement target object on the basis of the image pattern that is imaged using the first imaging unit and the second imaging unit. At
(Continued)

least a part of a mounting surface of the optical system is formed by a light absorbing member, and the first imaging unit and the second imaging unit are disposed out of a region to which reflected light that is regularly reflected from the cover in projection light of the image pattern is directly incident.

11 Claims, 9 Drawing Sheets

(51) Int. Cl.
    *H04N 13/239*     (2018.01)
    *G01B 11/25*     (2006.01)

(56) References Cited

U.S. PATENT DOCUMENTS

| | | | |
|---|---|---|---|
| 10,359,276 | B2 | 7/2019 | Lee et al. |
| 10,508,902 | B2* | 12/2019 | Tabuchi .................. G01B 21/04 |
| 2004/0130731 | A1 | 7/2004 | Yamaguchi |
| 2010/0008543 | A1* | 1/2010 | Yamada .................. G06T 7/521 |
| | | | 382/106 |
| 2010/0155599 | A1* | 6/2010 | Godavarty ........... A61B 5/4312 |
| | | | 250/334 |
| 2012/0120412 | A1 | 5/2012 | Bellis et al. |
| 2015/0233708 | A1 | 8/2015 | Gruhn |
| 2015/0319415 | A1 | 11/2015 | Hara |
| 2016/0005219 | A1* | 1/2016 | Powell .................. G06F 3/0425 |
| | | | 345/426 |
| 2016/0227193 | A1* | 8/2016 | Osterwood ............ G03B 17/55 |

FOREIGN PATENT DOCUMENTS

| | | |
|---|---|---|
| CN | 104956664 A | 9/2015 |
| CN | 205505996 U | 8/2016 |
| CN | 205785107 U | 12/2016 |
| EP | 2 592 328 A1 | 5/2013 |
| EP | 2 908 093 A1 | 8/2015 |
| JP | H06-168319 A | 6/1994 |
| JP | 2001-194232 A | 7/2001 |
| JP | 2004-239886 A | 8/2004 |
| JP | 2006-058215 A | 3/2006 |
| JP | 2006-121522 A | 5/2006 |
| JP | 2010-256182 A | 11/2010 |
| JP | 2011-176699 A | 9/2011 |
| JP | 2012-119448 A | 6/2012 |
| JP | 2012-215394 A | 11/2012 |

OTHER PUBLICATIONS

International Search Report issued in PCT/JP2018/002434; dated Mar. 13, 2018.
International Preliminary Report on Patentability issued in PCT/JP2018/002434; completed Jul. 12, 2018.
An Office Action mailed by the State Intellectual Property Office of the People's Republic of China dated Sep. 3, 2020, which corresponds to Chinese Patent Application No. 201880007332.9 and is related to U.S. Appl. No. 16/452,973; with English language translation.

* cited by examiner

THREE-DIMENSIONAL INFORMATION DETECTION DEVICE

CROSS-REFERENCE TO RELATED APPLICATIONS

The present application is a Continuation of PCT International Application No. PCT/JP2018/002434 filed on Jan. 26, 2018 claiming priority under 35 U.S.C § 119(a) to Japanese Patent Application No. 2017-015818 filed on Jan. 31, 2017. Each of the above applications is hereby expressly incorporated by reference, in their entirety, into the present application.

BACKGROUND OF THE INVENTION

1. Field of the Invention

The present invention relates to a three-dimensional information detection device, and particularly, to an active-type three-dimensional information detection device that projects an image pattern onto a measurement target object and calculates three-dimensional information of the measurement target object using the image pattern projected onto the measurement target object.

2. Description of the Related Art

In the related art, a three-dimensional information detection device that detects three-dimensional information of a stereoscopic shape of a measurement target object uses a triangulation principle. As the three-dimensional information detection device that uses the triangulation principle, a passive-type three-dimensional information detection device that performs measurement without projecting light onto a measurement target object to be measured, and an active-type three-dimensional information detection device that performs measurement by projecting light onto a measurement target object to be measured are known. Generally, the active-type is able to obtain detection accuracy higher than that in the passive-type.

As one kind of the active-type three-dimensional information detection device, there is a device that projects an image pattern of light onto a measurement target object from a projection unit and captures a stereoscopic image using two imaging units in directions different from a direction where the image pattern is projected on the basis of the projected image pattern to detect three-dimensional information of the measurement target object.

JP2012-215394A discloses an active-type three-dimensional information detection device, and discloses a three-dimensional measuring device that includes a pattern projector and two cameras as an optical system.

Further, JP2011-176699A discloses an imaging device that is configured as a digital camera that includes a pattern projection unit and two imaging units.

In recent years, such a three-dimensional information detection device has been widely used as means for recognizing a working target in an industrial robot that performs an assembly work or the like in a factory or the like or a consumer robot that performs support such as service or nursing. In the case of the consumer robot, in many cases, the consumer robot is usually formed in a variety of robot shapes for giving friendliness or kindness, for example, in a form of a human or an animal.

SUMMARY OF THE INVENTION

However, particularly, in a case where the active-type three-dimensional information detection device is used for a human-type or animal-type consumer robot, and in a case where an optical system that includes a projection unit, a first imaging unit, and a second imaging unit is provided in a state of being exposed outside the robot, its appearance becomes poor, and the degree of appearance production or the freedom of design is restricted.

The invention has been made in consideration of the above-mentioned problems, and an object of the invention is to provide a three-dimensional information detection device capable of being mounted in a robot with high design performance without restriction in its appearance.

In order to assign the degree of freedom for appearance design of a robot, a method for embedding an optical system inside the robot (for example, a head part of the robot) and covering the optical system with a light transmissive cover may be considered. However, in a case where the optical system is covered with the cover, a part of projection light projected onto a measurement target object through the cover is reflected from the cover, and thus, it is not possible to accurately perform triangulation due to the reflected light, so that detection accuracy of three-dimensional information of the measurement target object is lowered. Accordingly, the present inventors contrived a structure in which design performance is enhanced and reflected light does not affect lowering of detection accuracy of three-dimensional information by covering the optical system with the light transmissive cover.

According to an aspect of the invention, there is provided a three-dimensional information detection device comprising: a projection unit that projects projection light of an image pattern onto a measurement target object; a first imaging unit and a second imaging unit that each image the image pattern that is projected onto the measurement target object; a light transmissive cover that covers the projection unit, the first imaging unit, and the second imaging unit; and a calculation unit that calculates three-dimensional information of the measurement target object on the basis of a stereoscopic image indicating the image pattern that is imaged using the first imaging unit and the second imaging unit, in which at least a part of a mounting surface of a mounting part of the projection unit, the first imaging unit and the second imaging unit is formed by a light absorbing member, and the first imaging unit and the second imaging unit are disposed out of a region to which reflected light that is regularly reflected from the cover in projection light of the image pattern projected onto the measurement target object through the cover is directly incident. In other words, an arrangement relation of an optical system and the shape of the cover are set so that the reflected light is not directly incident to the first imaging unit and the second imaging unit.

In the three-dimensional information detection device according to this aspect of the invention, it is preferable that the reflected light that is reflected from the cover is incident to a region of the mounting surface other than a region where the first imaging unit and the second imaging unit are disposed, and more preferable that the reflected light is incident to a region of the mounting surface other than a region where the first imaging unit and the second imaging unit are disposed, which is formed by the light absorbing member.

In the three-dimensional information detection device according to this aspect of the invention, it is preferable that the projection light is invisible light, and more preferable that the invisible light is near infrared light.

In the three-dimensional information detection device according to this aspect of the invention, it is preferable that the mounting surface is formed by a light absorbing member in which a reflectivity of the projection light at a projection wavelength is equal to or smaller than 50%, more preferable that the reflectivity of the mounting surface is equal to or smaller than 30%, and most preferable that the reflectivity of the mounting surface is equal to or smaller than 10%. Here, the reflectivity means a total reflectivity obtained by adding up a regular reflectivity and a diffuse reflectivity, which is applied hereinafter in the same manner.

In the three-dimensional information detection device according to this aspect of the invention, it is preferable that a reflection surface of at least a part of a portion of the cover irradiated with the projection light has a reflectivity of the projection light at the projection wavelength of 8% or smaller, more preferable that the reflection surface of the cover has a reflectivity of 5% or smaller, and most preferable that the reflection surface of the cover has a reflectivity of 3% or smaller.

In the three-dimensional information detection device according to this aspect of the invention, it is preferable that a linear polarizing element that removes polarizing components that are greatly included in the reflected light is provided between the cover and the first and second imaging units.

In the three-dimensional information detection device according to this aspect of the invention, it is preferable that at least a part of the cover has a curved shape.

In the three-dimensional information detection device according to this aspect of the invention, it is preferable that the projection unit is disposed between the first imaging unit and the second imaging unit, and deviates from the center of the cover.

In the three-dimensional information detection device according to this aspect of the invention, it is preferable that the cover is configured so that a transmittance of the invisible light is larger than a transmittance of visible light.

According to the three-dimensional information detection device of the embodiment of the invention, even in a case where the optical system that includes the projection unit, the first imaging unit, and the second imaging unit is covered with the light transmissive cover so that the optical system is not exposed outside, it is possible to enhance detection accuracy of three-dimensional information of the measurement target object.

DESCRIPTION OF THE PREFERRED EMBODIMENTS

Hereinafter, embodiments for performing a three-dimensional information detection device of the invention will be described with reference to the accompanying drawings.

The invention will be described on the basis of the following preferred embodiments. The invention may be modified in various manners without departing from the scope of the invention, and embodiments other than the present embodiments may be used. Accordingly, any modification in the scope of the invention is included in claims.

Figure 1:
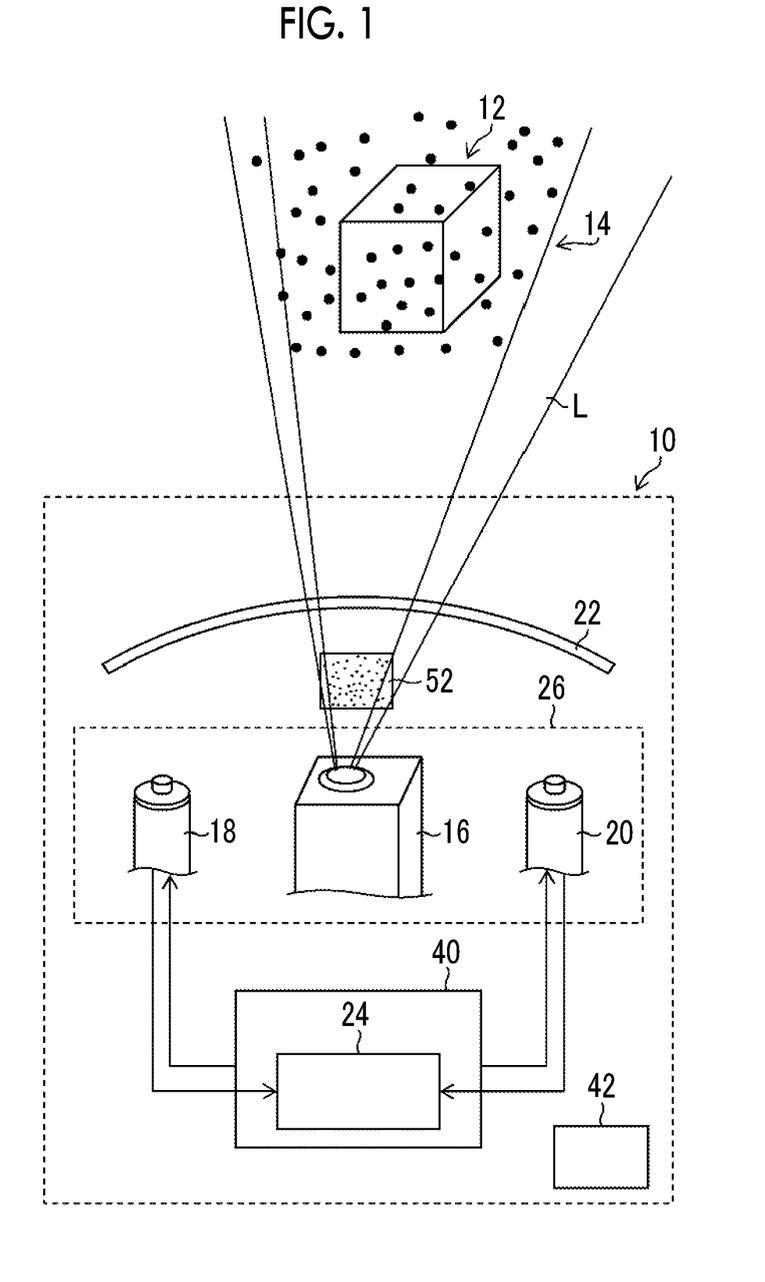
FIG. 1 is a conceptual diagram for illustrating an overall configuration of a three-dimensional information detection device.

FIG. 1 is a conceptual diagram showing a basic configuration of an active-type three-dimensional information detection device 10 according to an embodiment of the invention.

As shown in FIG. 1, the basic configuration of the three-dimensional information detection device 10 of this embodiment includes a projection unit 16 that projects projection light L of an image pattern 14 onto a measurement target object 12, a first imaging unit 18 and a second imaging unit 20 that respectively image the image pattern 14 projected onto the measurement target object 12, a light transmissive cover 22 that covers the projection unit 16, the first imaging unit 18 and the second imaging unit 20, and a calculation unit 24 that calculates three-dimensional information of the measurement target object 12 on the basis of a stereoscopic image indicating the image pattern 14 that is imaged using the first imaging unit 18 and the second imaging unit 20, as main components.

In this embodiment, the entirety of the projection unit 16, the first imaging unit 18, and the second imaging unit 20 is referred to as an optical system 26 of the three-dimensional information detection device 10.

Here, the light transmissive cover 22 that covers the projection unit 16, the first imaging unit 18, and the second imaging unit 20 is the cover 22 that covers the entirety of at least a front surface of the optical system 26 that faces the measurement target object 12, and does not include a cover that individually covers each member of the projection unit 16, the first imaging unit 18, and the second imaging unit 20.

Figure 2:
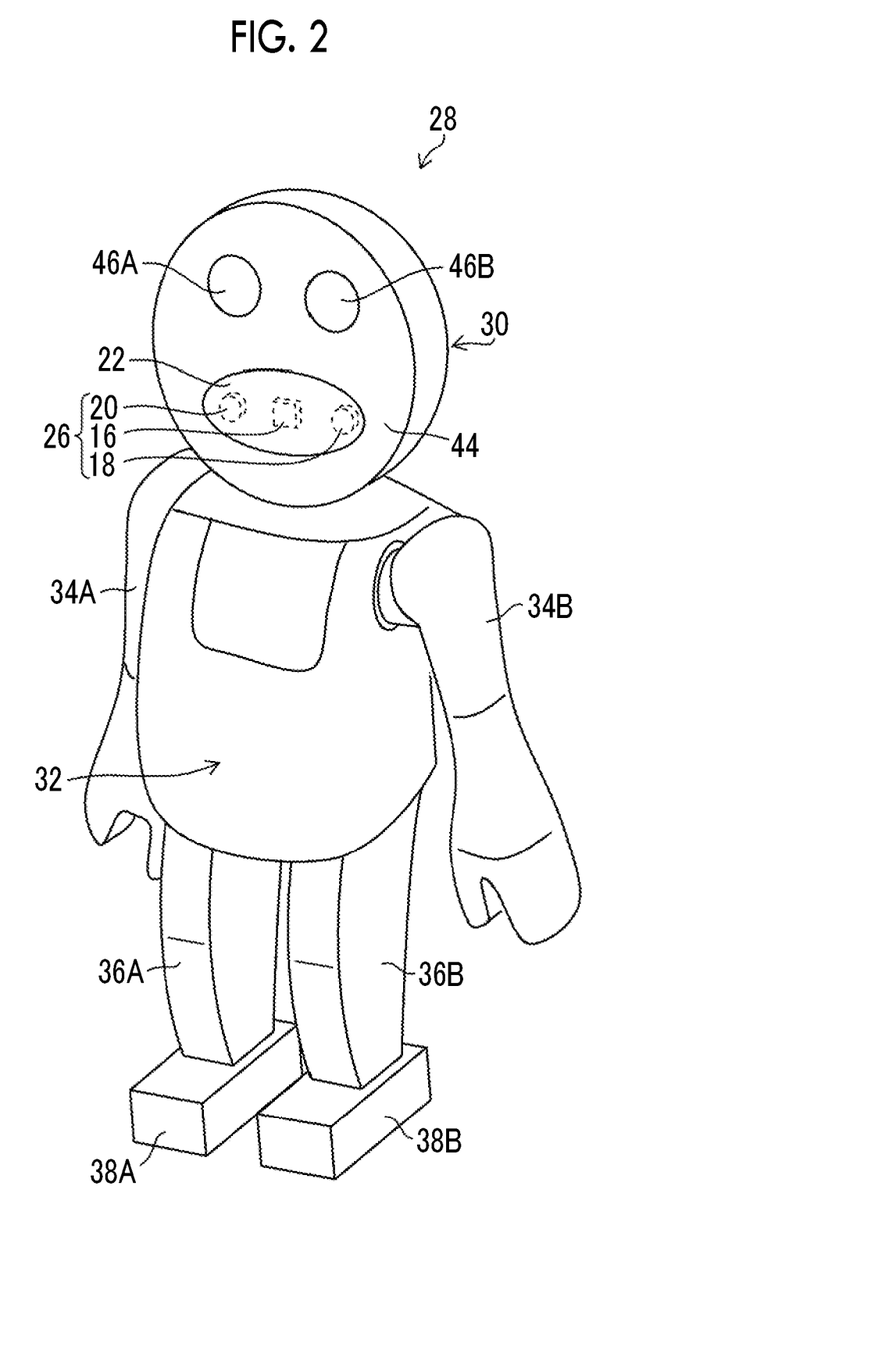
FIG. 2 is a diagram showing a state where the three-dimensional information detection device is applied to a human-type robot.

FIG. 2 is a diagram showing a state where the optical system 26 of the three-dimensional information detection device 10 according to the embodiment of the invention is embedded in a head part 30 of a human-type robot 28 and the optical system 26 is covered with the cover 22, so that an optical window for projection or imaging is formed on a facial surface of the robot 28.

In this embodiment, an example in which the three-dimensional information detection device 10 of the invention is assembled in the human-type robot 28 is shown, but the invention is not limited thereto, and may be applied to all types of active-type three-dimensional information detection devices 10 configured to cover the optical system 26 with the cover 22.

As shown in FIG. 2, the human-type robot 28 includes the head part 30, a body part 32, both hand parts 34A and 34B, both leg parts 36A and 36B, and walking parts 38A and 38B for walking provided in lower ends of the both leg parts 36A and 36B. As the walking parts 38A and 38B, for example, a self-propelling wheel or the like may be used.

Further, in the body part 32, a control device 40 (see FIG. 1) that controls the robot 28 and a power source device 42 (see FIG. 1) are provided. The calculation unit 24 that calculates the three-dimensional information may be provided as a part of the control device 40 as shown in FIG. 1, or may be provided as a separate device.

The head part 30 of the robot 28 is formed in an approximately spherical shape similar to the shape of a head part of the human, and designs having human's eyes 46A and 46B which have an image of human's eyes on both sides of an upper part of a front face 44 of the head part 30 are formed, and the optical system 26 of the three-dimensional information detection device 10 is embedded inside the head part 30.

Figure 3:
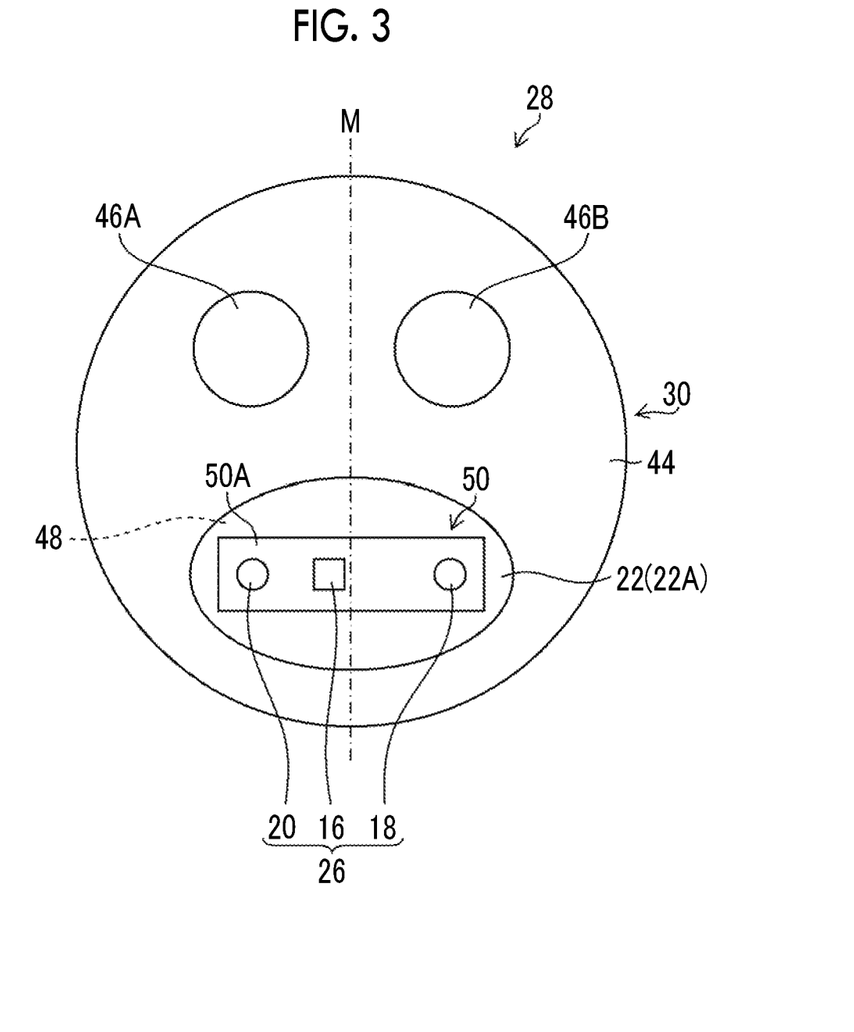
FIG. 3 is a diagram showing a front head part of the robot.
Figure 4:
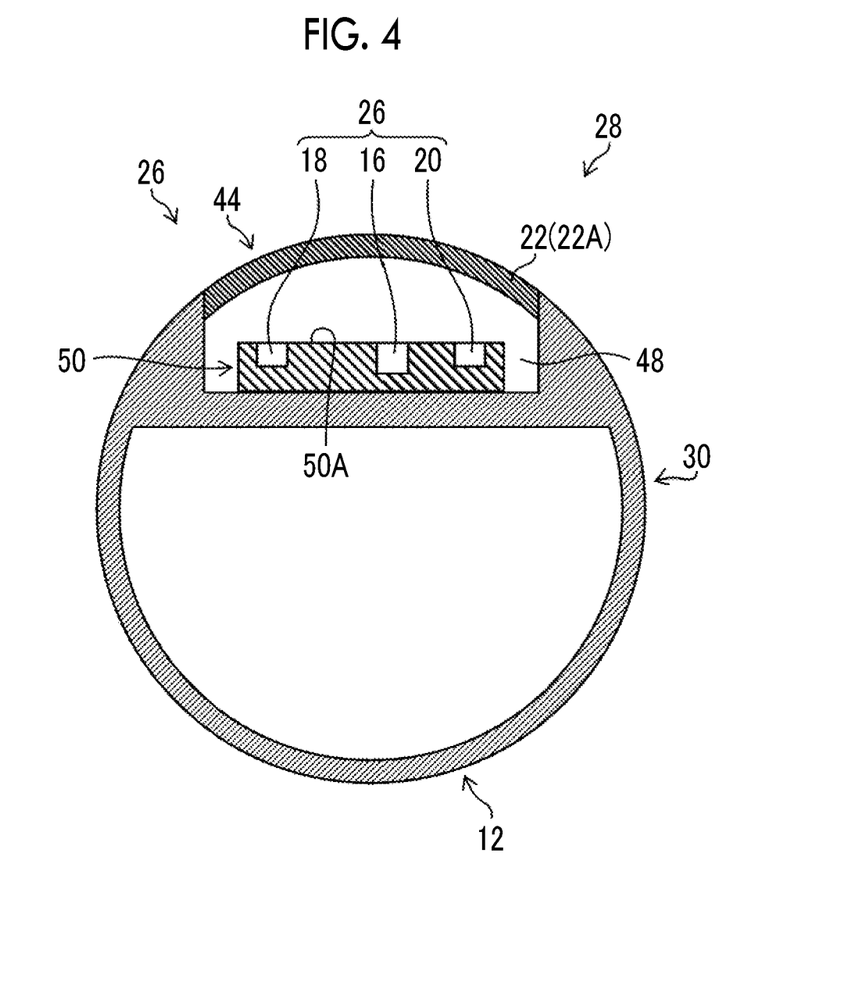
FIG. 4 is a cross-sectional view in a case where the head part of the robot is cut in a lateral direction at a position of an embedded optical system.

FIG. 3 is a diagram showing the front face of the head part 30 of the robot 28. FIG. 4 is a cross-sectional view in a case where the head part 30 is cut in a lateral direction at the position of the embedded optical system 26 and the cross section is seen from the top.

As shown in FIGS. 3 and 4, a concave embedded space 48 is horizontally formed from a lower central part of the front face 44 of the front of the head part 30 toward the inside of the head part 30.

Further, in an inlet opening (opening of the facial surface) of the embedded space 48, the light transmissive cover 22 of which at least a part is formed in a curve is provided. The cover 22 also becomes a design having a human's mouth 22A which has an image of a human's mouth in a lower part of the front face 44 of the robot 28.

In this embodiment, an example in which the shape of the embedded space 48 is an elliptical cylinder shape is shown, but other shapes such as a circular cylinder shape or a square pole shape may be used. Further, in this embodiment, an example in which an arc curved face obtained by bending an elliptical plate in an arc shape is used as the shape of the cover 22 is shown, but the invention is not limited thereto, and any configuration in which at least a part of the cover is formed in a curved surface shape may be used.

Further, on a bottom (a face opposite to the inlet opening) of the embedded space 48, a rectangular parallelepiped mounting part 50 on which the optical system 26 is mounted is fixed.

On a mounting surface 50A of the rectangular parallelepiped mounting part 50, the first imaging unit 18 and the second imaging unit 20 are bisymmetrically disposed in a width direction of the head part 30 with reference to a longitudinal median line M of the cover 22, and three-dimensional information including information on a distance to the measurement target object 12 is obtained by the two imaging units 18 and 20. That is, the two imaging units 18 and 20 form a stereoscopic camera for obtaining stereoscopic information of the measurement target object 12. As the first imaging unit 18 and the second imaging unit 20, an electronic camera such as a charge-coupled device (CCD) camera or a complementary metal oxide semiconductor (CMOS) camera may be used.

Further, the projection unit 16 is disposed between the first imaging unit 18 and the second imaging unit 20, and an image pattern is projected from the projection unit 16 onto the measurement target object 12. As the image pattern 14, for example, as shown in FIG. 1, a random dot pattern in which a positional relationship of respective dots is determined in advance is preferably used. However, the image pattern is not limited thereto, and any image pattern may be used as long as the image pattern is an image pattern from which stereoscopic information can be acquired. FIG. 1 shows an example in which a dot screen 52 is disposed in front of the projection unit 16 as a form of the random dot pattern, and in this case, a random dot pattern projector may be preferably used as the projection unit 16.

In order to detect the three-dimensional information of the measurement target object 12 by the three-dimensional information detection device 10 having the above-described configuration, the image pattern 14 (for example, a random dot pattern) is projected onto the measurement target object 12 through the cover 22 from the projection unit 16. Further, the image pattern 14 projected on the measurement target object 12 is imaged using two imaging units of the first imaging unit 18 and the second imaging unit 20, so that a stereoscopic image including a pattern image of the image pattern 14 is acquired.

In this case, it is preferable that the projection unit 16 is disposed between the first imaging unit 18 and the second imaging unit 20 and deviates from the longitudinal median line M of the cover 22, as shown in FIG. 3. Further, it is preferable that the first imaging unit 18 and the second imaging unit 20 are asymmetrically disposed with respect to the projection unit 16. With this configuration, it is possible to easily perform three-dimensional detection of the measurement target object 12, and also, to easily form an optical system-related circuit formed on a rear surface side of the mounting part 50.

Further, the calculation unit 24 calculates a depth (distance) on the basis of the triangulation principle for each corresponding point of stereoscopic images (respective pattern images) captured using the first imaging unit 18 and the second imaging unit 20, to thereby acquire three-dimensional information of the measurement target object 12. A method for calculating the three-dimensional information of the measurement target object 12 by the calculation unit 24 may be a known method that uses a parallax of the stereoscopic images, for example, but in this embodiment, since the method does not relate the concept of the invention, detailed description thereof will not be performed.

Thus, it is possible to detect (recognize) three-dimensional information such as a stereoscopic shape of the measurement target object 12 using the three-dimensional information detection device 10 of the embodiment.

Generally, in a case where an optical system of a three-dimensional information detection device is covered with a cover, it is not possible to accurately perform triangulation using reflected light reflected from the inside of the cover in projection light projected onto a measurement target object through the cover. That is, in a case where the optical system is covered with the cover, there is a problem in that it is not possible to show a unique high detection characteristic of an active-type three-dimensional information detection device.

The inventors of the invention found out that in an active-type three-dimensional information detection device, in a case where an optical system that includes a projection unit, a first imaging unit and a second imaging unit is covered with a cover, the intensity of reflected light (hereinafter, referred to as "cover-reflected light") that is regularly reflected from the inside of the cover with respect to an entire intensity of projection light projected from the projection unit is normally 10% or smaller, but in a case where the cover-reflected light is directly incident to the first imaging unit and the second imaging unit, it is not possible to accurately perform triangulation of the measurement target object.

The reason why the triangulation cannot be accurately performed is because it is not possible to discriminate whether the light incident to the first imaging unit and the second imaging unit is reflected light that is reflected from the measurement target object (hereinafter, referred to as "work-reflected light") or the cover-reflected light that is reflected from the cover.

Accordingly, the three-dimensional information detection device 10 of the embodiment of the invention solves the problems by adding the following two configurations to the above-mentioned basic configuration.

(First Configuration)

A positional relationship between the projection unit 16, the first imaging unit 18, the second imaging unit 20, and the cover 22, and the shape of the cover 22 are set so that cover-reflected light that is regularly reflected from the cover 22 in the projection light L of the image pattern 14 projected onto the measurement target object 12 through the cover 22 is not directly incident to the first imaging unit 18 and the second imaging unit 20.

Figure 5:
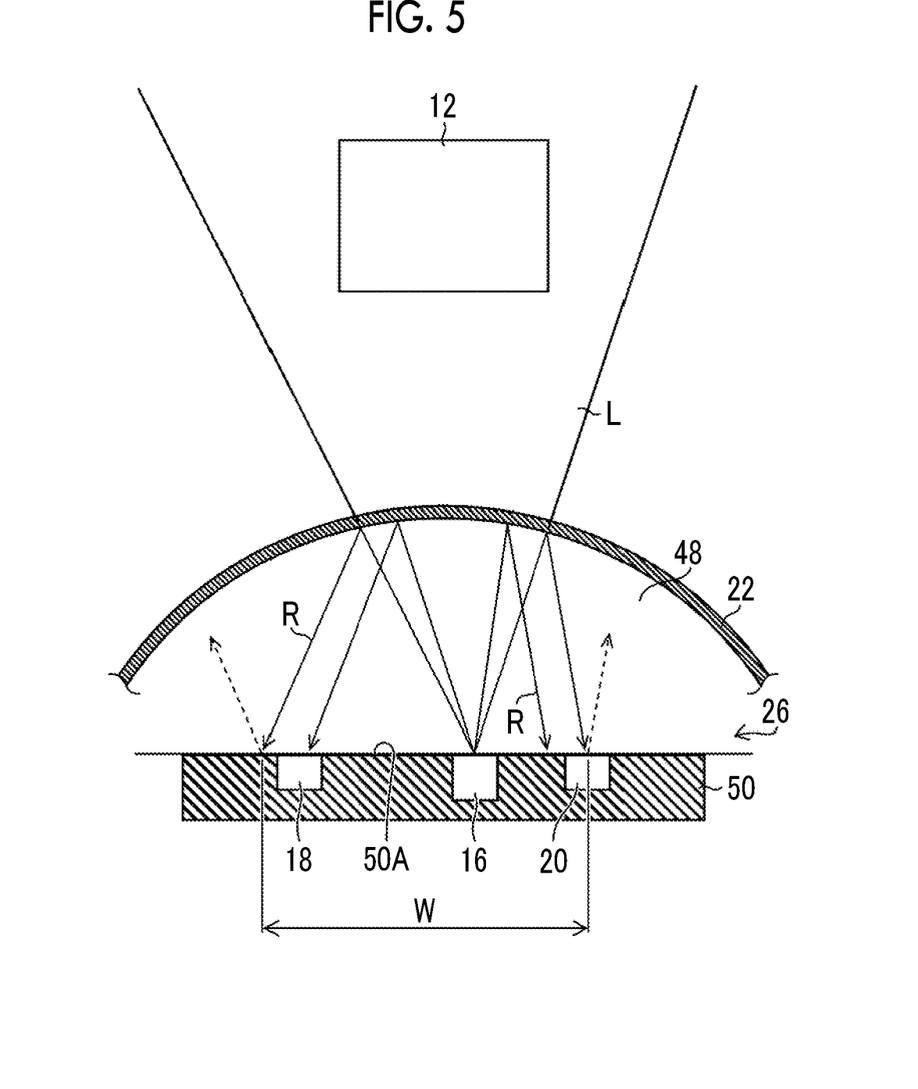
FIG. 5 is a diagram for illustrating a state where cover-reflected light is directly incident to a first imaging unit and a second imaging unit.
Figure 6:
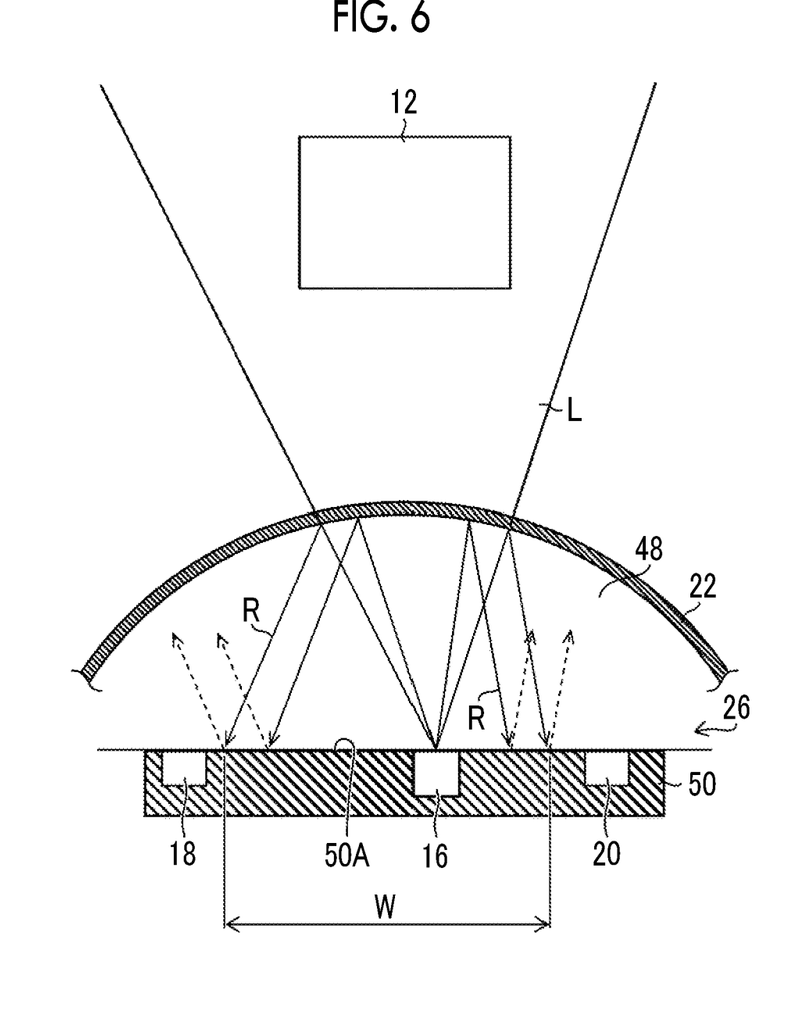
FIG. 6 is a diagram for illustrating a state where the cover-reflected light is not directly incident to the first imaging unit and the second imaging unit.

FIG. 5 shows a case where the first configuration is not satisfied, and FIG. 6 shows a case where the first configuration is satisfied. In FIGS. 5 and 6, cover-reflected light R is only shown, and work-reflected light is not shown.

Here, the "directly incident" means that the cover-reflected light R reflected from the cover 22 is directly incident to the first imaging unit 18 or the second imaging unit 20, and does not include indirect incidence that the cover-reflected light R is reflected from the cover 22 and repeats reflection (for example, indicated by dot lines in FIGS. 5 and 6) from a member other than the cover 22 to finally be incident to the first imaging unit 18 or the second imaging unit 20.

In FIG. 5, a case where the first imaging unit 18 and the second imaging unit 20 are disposed within a direct incidence maximum region W of the cover-reflected light R that is regularly reflected from the cover 22 and is directly incident to the mounting surface 50A of the optical system 26 in the projection light L is shown. In this case, the cover-reflected light R is directly incident to the first imaging unit 18 and the second imaging unit 20.

On the other hand, in FIG. 6, a case where the first imaging unit 18 and the second imaging unit 20 are disposed out of the direct incidence maximum region W of the cover-reflected light R that is regularly reflected from the cover 22 and is directly incident to the mounting surface 50A of the optical system 26 in the projection light L is shown. In this case, the cover-reflected light R is not directly incident to the first imaging unit 18 and the second imaging unit 20.

FIG. 6 shows a structure example in which separation distances of the first imaging unit 18 and the second imaging unit 20 with respect to the projection unit 16 are larger than those in FIG. 5 so that the first imaging unit 18 and the second imaging unit 20 are disposed out of the direct incidence maximum region W of the cover-reflected light R (hereinafter, referred to as "structure example 1").

However, in performing a setting so that the first imaging unit and the second imaging unit are disposed out of the direct incidence maximum region W of the cover-reflected light R, a method for setting the shape of the cover 22 (hereinafter, referred to as a "structure example 2"), or a method for setting a separation distance between the cover 22 and the optical system 26 (hereinafter, referred to as a "structure example 3") may be used instead of the structure example 1. It is more preferable to use a combination of the structure example 1 to the structure example 3.

Further, the above-mentioned three structure examples are associated with each other, but the distances between the projection unit and the imaging units of the structure example 1 are preferably equal to or greater than 1 mm, more preferably, equal to or greater than 5 mm, and most preferably, equal to or greater than 10 mm. In the structure example 1, in a case where the separation distances from the first imaging unit 18 and the second imaging unit 20 to the projection unit 16 are excessively small to be smaller than 1 mm, even in a case where the different structure examples 2 and 3 are combined, it is difficult to perform a setting so that the cover-reflected light R is not directly incident to the first imaging unit 18 and the second imaging unit 20.

(Second Configuration)

At least a part of the mounting surface 50A of the mounting part 50 of the projection unit 16, the first imaging unit 18 and the second imaging unit 20 is formed by a light absorbing member 54. It is more preferable that the entirety of the mounting surface 50A is formed by the light absorbing member 54.

Figure 7:
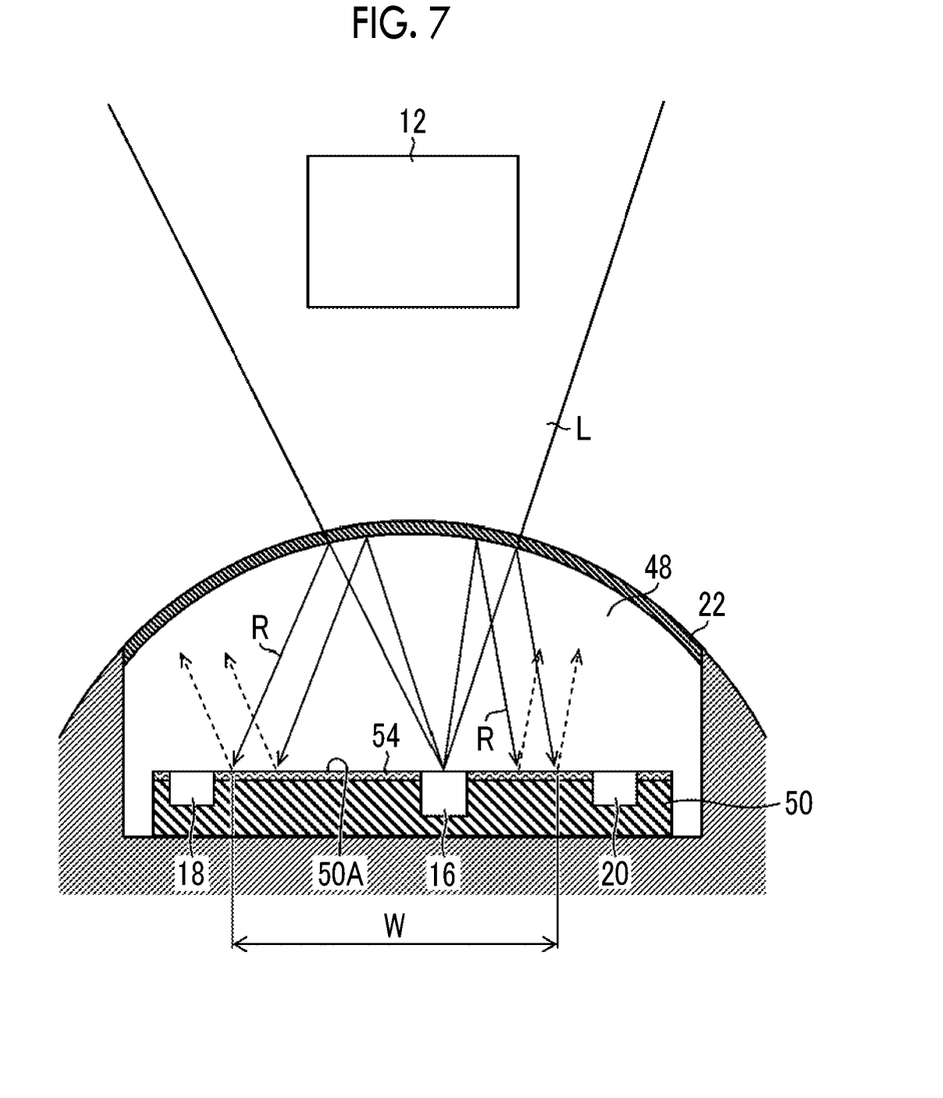
FIG. 7 is a diagram showing a state where at least a mounting surface on which an optical system is mounted is formed in a light absorbing member.

FIG. 7 shows a case where the entirety of the mounting surface 50A is coated with black organic paint as the light absorbing member 54. Here, the mounting surface 50A may be coated through screen printing, or the like. Further, the light absorbing member 54 in this embodiment is not limited to the black organic paint, and for example, a thin film of metal oxide such as a titanium oxide film, an aluminum oxide film, or a composite film thereof, or other known films may be used.

According to the second configuration, since the cover-reflected light R incident to the mounting surface 50A in the cover-reflected light R is absorbed by the light absorbing member 54, it is possible to reduce indirectly incident light that is reflected again from the mounting surface 50A and is indirectly incident to the first imaging unit 18 and the second imaging unit 20.

It is preferable that a reflectivity of the mounting surface 50A formed by the light absorbing member 54 is set so that a reflectivity of the projection light L at a projection wavelength is equal to or smaller than 50%. More preferably, the reflectivity of the mounting surface 50A is set so that the reflectivity of the projection light L at the projection wavelength is equal to or smaller than 30%, most preferably, is set so that the reflectivity of the projection light L at the projection wavelength is equal to or smaller than 10%.

According to the above-described two configurations, even in a case where the optical system 26 that includes the projection unit 16 and the imaging units 18 and 20 is covered with the light transmissive cover 22 so as not to be exposed outside, it is possible to accurately perform triangulation, and thus, it is possible to detect three-dimensional information of the measurement target object 12 with high accuracy.

Further, in order to accurately perform the triangulation even though the optical system 26 is covered with the cover 22 and to detect the three-dimensional information with high accuracy, it is preferable to add the following configurations (1) to (5) in addition to the first configuration and the second configuration.

(1) it is preferable that 80% or more of the entire intensity of the cover-reflected light R reflected from the cover 22 is incident to the mounting surface 50A. More preferably, 90% or more thereof is incident thereto, and most preferably, 95% or more thereof is incident thereto.

That is, at least one of the structure example 1 to the structure example 3 is performed so that 90% or more of the entire intensity of the cover-reflected light R is incident to the mounting surface 50A, in addition to the first configuration for preventing the cover-reflected light R from being directly incident to the first imaging unit 18 and the second imaging unit 20.

Here, the mounting surface 50A refers to a mounting surface around the imaging units excluding the first imaging unit 18 and the second imaging unit 20.

In the first configuration, even in a case where the cover-reflected light R is not directly incident to the first imaging unit 18 and the second imaging unit 20, in a case where there is a large amount of light that is indirectly incident to the first imaging unit 18 and the second imaging unit 20, the accuracy of triangulation is easily lowered.

Accordingly, in a case where 90% or more of the entire intensity of the cover-reflected light R is set to be incident to the mounting surface 50A formed by the light absorbing member 54, most of the cover-reflected light R is absorbed by the mounting surface 50A. Thus, it is possible to remarkably reduce the intensity of the cover-reflected light R that is indirectly incident to the first imaging unit 18 and the second imaging unit 20, and thus, it is possible to more accurately perform the triangulation.

In this case, it is more preferable that 95% or more of the entire intensity of the cover-reflected light R is incident to the mounting surface 50A formed by the light absorbing member 54, and most preferably, 98% or more.

(2) It is preferable that the projection light L is invisible light, and it is particularly preferable that the invisible light is near infrared light (a wavelength of 780 nm to 2000 nm).

Since the near infrared light has a wavelength longer than that of visible light, the infrared light is not easily scattered. Accordingly, it is possible to easily set the structure example 1 to the structure example 3 so that the cover-reflected light R that is regularly reflected from the cover 22 is not directly incident to the first imaging unit 18 and the second imaging unit 20.

In a case where the invisible light is used, it is preferable that the cover 22 is configured so that a transmittance of the invisible light is larger than a transmittance of the visible light. For example, a filter (not shown) that easily transmits invisible light and does not easily transmit visible light may be provided in the cover 22. Thus, in a case where the three-dimensional information detection device 10 is applied to the human-type robot 28, it is possible to reduce reflection of invisible light in the cover 22. Further, it is possible to make it difficult to view the optical system 26 inside the cover 22 from the outside of the robot 28, which is preferable in terms of design.

Further, using a characteristic that near infrared light is not easily scattered, it is possible to image a measurement target object on the other side while passing through smoke, a thin fabric, or the like. Further, since the near infrared light also has an invisible characteristic, even in a case where the measurement target object 12 is irradiated with the near infrared light at night, it is possible to perform imaging without being noticed by the measurement target object 12.

(3) It is preferable that a reflection surface of at least a part of a portion of the cover 22 irradiated with the projection light L has a reflectivity of the projection light L at the projection wavelength of 8% or smaller. More preferably, the reflectivity of the cover is equal to or smaller than 5%, and most preferably is equal to or smaller than 3%.

Figure 8:
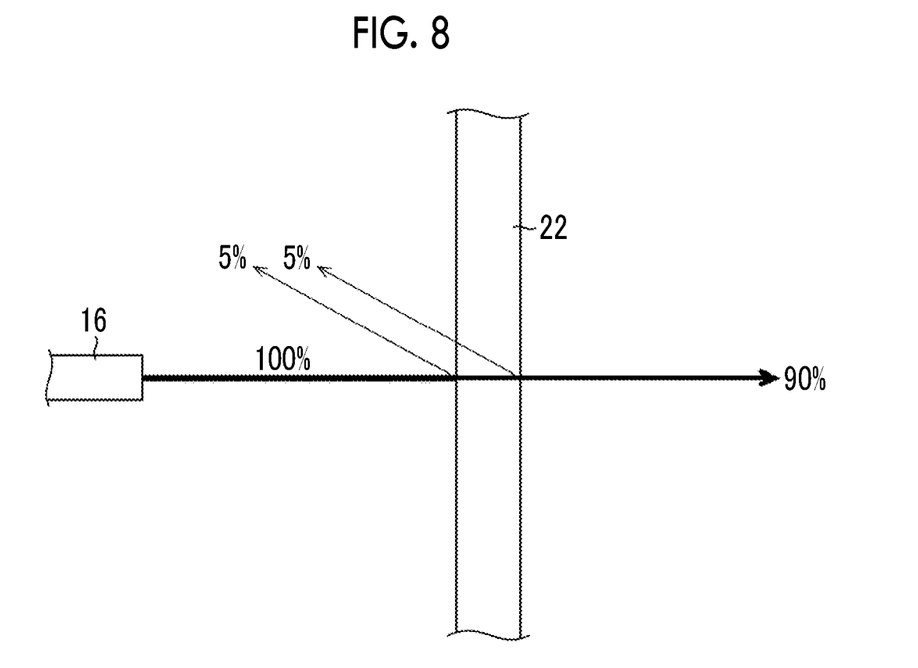
FIG. 8 is a diagram for illustrating the cover-reflected light.

FIG. 8 is an enlarged diagram showing a state where the projection light L projected from the projection unit 16 is regularly reflected from the cover 22.

As shown in FIG. 8, reflection in the cover 22 includes reflection from a front surface (a boundary surface with air on an incidence side) and reflection from a rear surface (a boundary surface with air on an emission side) of the cover 22. That is, the cover 22 includes two reflection surfaces (or reflection boundary surfaces) of the front surface and the rear surface.

Accordingly, the reflectivity of the cover 22 of the projection light L at the projection wavelength becomes a sum of reflectivities on both of the front surface and the rear surface. Further, as described above, the reflectivity means a total reflectivity obtained by adding up a regular reflectivity and a diffuse reflectivity.

For example, in a case where the near infrared light is used as the projection light L and the cover 22 is formed of polycarbonate, the reflectivities on the front surface and the rear surface are about 5%, respectively, and thus, the reflectivity of the cover 22 becomes about 10% in total.

In order to reduce the reflectivity of the cover 22, a known antireflective film such as a diamond like carbon (DLC) film or a magnesium fluoride film may be provided on at least one of the front surface or the rear surface of the cover 22, for example.

With this configuration, it is possible to remarkably reduce the cover-reflected light R from the cover 22, and thus, it is possible to more accurately perform the triangulation.

Figure 9:
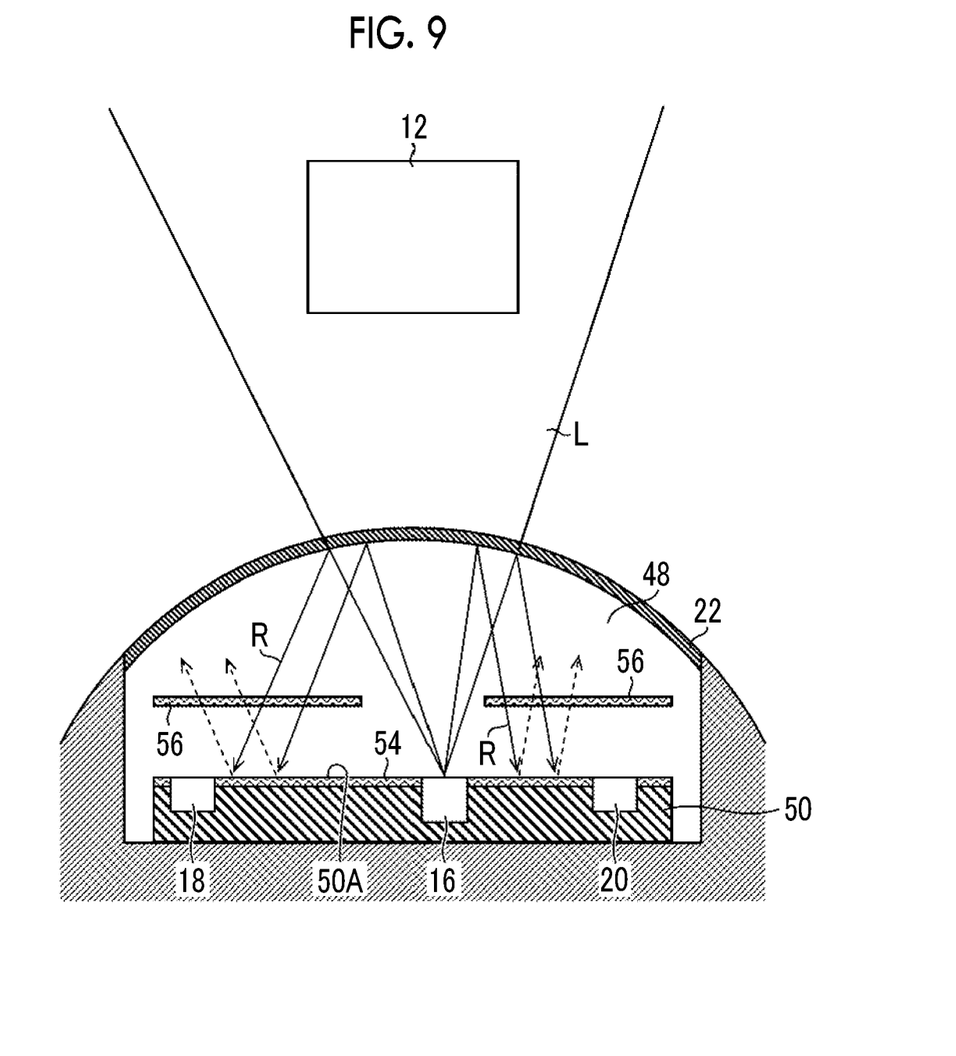
FIG. 9 is a diagram showing a state where a linear polarizing element is disposed between a cover and the first and second imaging units.

(4) As shown in FIG. 9, it is preferable that linear polarizing elements 56 and 56 that remove polarizing components that are greatly included in the cover-reflected light R are provided between the cover 22 and the first and second imaging units 18 and 20.

In a case where the projection light L is reflected from both of the front surface (the boundary surface with air on the incidence side) and the rear surface (the boundary surface with air on the emission side) of the cover 22, the light may be divided into an S-wave component and a P-wave component, and generally, one of the S-wave component and the P-wave component is included more than the other one in the cover-reflected light R.

Accordingly, in a case where the linear polarizing elements 56 and 56 that remove polarizing components that are greatly included in the cover-reflected light R are provided between the cover 22 and the first and second imaging units 18 and 20, it is possible to remarkably reduce the cover-reflected light R, and thus, it is possible to more accurately perform the triangulation.

(5) The cover 22 in this embodiment also includes a planar shape, but it is preferable that at least a part thereof is a curved shape. In other words, it is preferable that the projection unit 16 and at least the part of the cover 22 are not parallel to each other, and the first imaging unit 18 and the second imaging unit 20, and at least the part of the cover 22 are not parallel to each other.

Since the cover-reflected light R that is regularly reflected from the cover 22 is easily enlarged and is not easily directly incident to the first imaging unit 18 and the second imaging unit 20 in a case where the cover 22 has a curved shape compared with a case where the cover 22 has a planar shape, the invention becomes more effective in this case.

For example, in a case where the shape of the cover 22 in a reflection region of the projection light L is not a plane parallel to the projection unit 16 but is a curved shape, the invention becomes more effective. Further, in a case where the shape of the cover 22 in an imaging region of the first imaging unit 18 and the second imaging unit 20 is not a planar shape parallel to the first imaging unit 18 and the second imaging unit 20 but is a curved shape, the invention becomes more effective.

Further, by forming the cover 22 in a curved shape, in a case where the optical system of the three-dimensional information detection device 10 is embedded in the head part 30 of the robot 28, it is possible to form an optical window in accordance with a curved surface of the face 44 of the robot 28, and to more enhance the degree of appearance production.

In addition, the separation distance between the cover 22 and the optical system 26 are preferably 1 mm or greater, more preferably 5 mm or greater, and most preferably 10 mm or greater. As the separation distance between the cover 22 and the optical system 26 becomes larger, the direct incidence maximum region W of the cover-reflected light R becomes larger. Thus, since the cover-reflected light R is not easily directly incident to the first imaging unit 18 and the second imaging unit 20, the invention becomes more efficient.

Furthermore, the film coated as the light absorbing member 54 may be attached in front of the mounting surface 50A. By providing the light absorbing member 54 between the mounting surface 50A and the cover 22, it is possible to prevent the projection light L from being repeatedly reflected inside the cover 22, and thus, to reduce a bad influence of reflected light on measurement accuracy.

EXPLANATION OF REFERENCES

10: three-dimensional information detection device
12: measurement target object
14: image pattern
16: projection unit
18: first imaging unit
20: second imaging unit
22: cover
22A: human's mouth
24: calculation unit
26: optical system
28: robot
30: head part
32: body part
34A, 34B: hand part
36A, 36B: leg part
38A, 38B: walking part
40: control device
42: power source device
44: face
46A, 46B: human's eye
48: embedded space
50: mounting part
50A: mounting surface
52: dot screen
54: light absorbing member
56: linear polarizing element

What is claimed is:

1. A three-dimensional information detection device comprising:
   a projection unit that projects projection light of an image pattern onto a measurement target object;
   a first imaging unit and a second imaging unit that each image the image pattern that is projected onto the measurement target object;
   a light transmissive cover that covers the projection unit, the first imaging unit, and the second imaging unit; and
   a calculation unit that calculates three-dimensional information of the measurement target object on the basis of a stereoscopic image indicating the image pattern that is imaged using the first imaging unit and the second imaging unit,
   wherein at least a part of a mounting surface of a mounting part of the projection unit, the first imaging unit and the second imaging unit is formed by a light absorbing member, and
   wherein the first imaging unit and the second imaging unit are disposed out of a region to which reflected light that is regularly reflected from the cover in projection light of the image pattern projected onto the measurement target object through the cover is directly incident.

2. The three-dimensional information detection device according to claim 1,
   wherein the reflected light that is reflected from the cover is incident to a region of the mounting surface other than a region where the first imaging unit and the second imaging unit are disposed.

3. The three-dimensional information detection device according to claim 1,
   wherein the projection light is invisible light.

4. The three-dimensional information detection device according to claim 3,
   wherein the cover is configured so that a transmittance of the invisible light is larger than a transmittance of visible light.

5. The three-dimensional information detection device according to claim 3,
   wherein the invisible light is near infrared light.

6. The three-dimensional information detection device according to claim 1,
   wherein the mounting surface is formed by a light absorbing member in which a reflectivity of the projection light at a projection wavelength is equal to or smaller than 50%.

7. The three-dimensional information detection device according to claim 1,
   wherein a reflection surface of at least a part of a portion of the cover irradiated with the projection light has a reflectivity of the projection light at the projection wavelength of 8% or smaller.

8. The three-dimensional information detection device according to claim 1,
   wherein a linear polarizing element that removes polarizing components that are greatly included in the reflected light is provided between the cover and the first and second imaging units.

9. The three-dimensional information detection device according to claim 1,
   wherein at least a part of the cover has a curved shape.

10. The three-dimensional information detection device according to claim 1,
    wherein the projection unit is disposed between the first imaging unit and the second imaging unit, and deviates from the center of the cover.

11. The three-dimensional information detection device according to claim 1,
    wherein the projection unit, the first imaging unit and the second imaging unit are arranged integrally to the mounting part and flush with the mounting surface facing to the cover.

* * * * *